US008810223B2

United States Patent
Yu

(10) Patent No.: US 8,810,223 B2
(45) Date of Patent: Aug. 19, 2014

(54) METHOD AND APPARATUS FOR SUPPLYING POWER TO 300 PIN MSA 40GB TRANSPONDER

(75) Inventor: Xueyu Yu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 257 days.

(21) Appl. No.: 13/392,494

(22) PCT Filed: Dec. 21, 2009

(86) PCT No.: PCT/CN2009/075782
§ 371 (c)(1),
(2), (4) Date: Feb. 24, 2012

(87) PCT Pub. No.: WO2011/022908
PCT Pub. Date: Mar. 3, 2011

(65) Prior Publication Data
US 2012/0153923 A1 Jun. 21, 2012

(30) Foreign Application Priority Data
Aug. 27, 2009 (CN) .......................... 2009 1 0171265

(51) Int. Cl.
G05F 1/00 (2006.01)
G05F 1/569 (2006.01)
G05F 1/571 (2006.01)

(52) U.S. Cl.
USPC .......................... 323/283; 323/241; 323/276

(58) Field of Classification Search
USPC .................. 323/241, 273–276, 283; 341/110; 370/366; 398/158, 159
See application file for complete search history.

(56) References Cited

U.S. PATENT DOCUMENTS

| | | | |
|---|---|---|---|
| 2005/0029998 A1* | 2/2005 | Brachmann et al. | 323/283 |
| 2006/0267564 A1* | 11/2006 | Badami | 323/274 |
| 2007/0029983 A1* | 2/2007 | Jiang et al. | 323/274 |
| 2008/0067987 A1* | 3/2008 | Tung et al. | 323/271 |
| 2008/0166133 A1 | 7/2008 | Hsiao | |

FOREIGN PATENT DOCUMENTS

| | | |
|---|---|---|
| CN | 2831623 Y | 10/2006 |
| CN | 101520669 A | 9/2009 |

OTHER PUBLICATIONS

ISR for related PCT/CN2009/075782 mailed on Jun. 3, 2012; and its English translation.
IPRP/WO for related PCT/CN2009/075782 issued on Feb 28, 2012; and its English translation.
300PIN MSA, pp. 10 to 13, May 1, 2002, [retrieved on May 26, 2010]. Retrieved from the Internet: <URL: http://www.300pinmsa.org/html/documents.html>.

* cited by examiner

Primary Examiner — Adolf Berhane
Assistant Examiner — Gary Nash
(74) Attorney, Agent, or Firm — Ladas & Parry, LLP

(57) ABSTRACT

A method and an apparatus for supplying power to a 300 PIN MSA 40 Gb TRANSPONDER (22), wherein the apparatus comprises a power supply control module (21), a first resistor ($R_2$), a second resistor ($R_3$) and a third resistor ($R_4$). The power supply control module (21) supplies power to the TRANSPONDER (22) through the APS Digital pin (APS Digital) of the TRANSPONDER (22). A reference voltage terminal ($V_{feedback}$) of the power supply control module (21) is connected to the APS Sense pin (APS Sense) of the TRANSPONDER (22) by the second resistor ($R_3$), connected to the APS Set pin (APS Set) of the TRANSPONDER (22) by the first resistor ($R_2$) and connected to the bias voltage terminal ($V_{bias}$) of the power supply control module (21) by the third resistor ($R_4$). The method and the apparatus can increase selection of the power supply control module (21) without occupying excessive space of circuit board, while ensuring precision of supply voltage.

7 Claims, 3 Drawing Sheets

METHOD AND APPARATUS FOR SUPPLYING POWER TO 300 PIN MSA 40GB TRANSPONDER

CROSS-REFERENCE TO RELATED APPLICATIONS

This application is the U.S. National Stage of International Patent Application No. PCT/CN2009/075782 filed on Dec. 21, 2009, which claims priority to Chinese Patent Application Number 200910171265.7 filed on Aug. 27, 2009, the disclosures of which are hereby incorporated by reference in their entireties.

FIELD OF THE INVENTION

The present invention relates to the electronic technical field, and in particular to a method and an apparatus for supplying power to a 300 PIN MSA 40 Gb TRANSPONDER.

BACKGROUND OF THE INVENTION

The 300 PIN MSA 40 Gb TRANSPONDER protocol "REFERENCE DOCUMENT FOR 300 PIN 40 Gb TRANSPONDER" requires that a single board is capable of providing an Adaptable Power Supply (APS) with a voltage range of 1.2V~2.5V for a 300 PIN MSA 40 Gb TRANSPONDER. The protocol gives the connection block diagram between the APS and the TRANSPONDER, as shown in FIG. 1A. According to the protocol, the pins between the APS and the 300 PIN TRANSPONDER include 4 signals which are APS Digital, APS SENSE, APS SET and GND respectively. The APS Digital is used to supply power to the TRANSPONDER, the APS SET sets the regulation point of APS output voltage and the APS SENSE signal provides remote sensing to the output voltage APS POWER. Correspondingly, there are four pins between the APS and the 300 PIN TRANSPONDER, which are APS Digital pin, APS SENSE pin, APS SET pin and GND pin respectively.

To make reckoning and understanding easy, FIG. 1A can be simplified, as shown in FIG. 1B. The calculation formula for $V_{APS\_Digital}$ can be obtained from FIG. 1B:

$$V_{APS\_Digital} V_{sense} \times R_3/(R_2+R_1)+V_{sense} \quad (1)$$

The protocol specifies the correlation between the output $V_{APS\_Digital}$ and resistor $R_1$, as shown in Table 1.

TABLE 1

Correlation between the output $V_{APS\_Digital}$ ($V_{out}$) and resistor $R_1$

| $R_1$ resistance value (Ω) | $V_{out}$ (V) |
| --- | --- |
| 1530 | 1.2 |
| 672 | 1.5 |
| 330 | 1.8 |
| 0 | 2.5 |

The $V_{out}$ in Table 1 is $V_{APS\_Digital}$. According to the correlation specified in Table 1 between the resistance value of $R_1$ and $V_{APS\_Digital}$, the 300 PIN 40 Gb TRANSPONDER protocol gives a parameter selection solution which can meet the correlation: $V_{sense}=0.8V$, $R_2=470Ω$ and $R_3=1000Ω$. Based on this parameter selection solution, as shown in FIG. 1, only the power supply control chip with a reference voltage (namely, the $V_{feedback}$ in the Figure) of 0.8V can meet the requirements. This narrows the selection scope of the power supply control chip.

SUMMARY OF THE INVENTION

The present invention provides a method and an apparatus for supplying power to a 300 PIN MSA 40 Gb TRANSPONDER, so as to solve the problem that the selection scope of power supply control chip is too narrow when supplying power to a 300 PIN MSA 40 Gb TRANSPONDER in the conventional art.

To solve the above problem, the present invention provides the following technical solution.

A method for supplying power to a 300 PIN MSA 40 Gb TRANSPONDER, comprising:

a power supply control module supplying power to the 300 PIN MSA 40 Gb TRANSPONDER through APS Digital pin of the 300 PIN MSA 40 Gb TRANSPONDER;

a reference voltage terminal of the power supply control module connecting to the APS sense pin of the 300 PIN MSA 40 Gb TRANSPONDER by a resistor $R_3$, connecting to the APS Set pin of the TRANSPONDER by a resistor $R_2$ and connecting to a bias voltage terminal of itself by a resistor $R_4$.

An apparatus for supplying power to a 300 PIN MSA 40 Gb TRANSPONDER, comprising a power supply control module, a resistor $R_2$, a resistor $R_3$ and a resistor $R_4$, wherein the power supply control module is configured to supply power to a 300 PIN MSA 40 Gb TRANSPONDER through a APS Digital pin of the 300 PIN MSA 40 Gb TRANSPONDER, and the power supply control module contains a reference voltage terminal used to receive external feedback voltage and a bias voltage terminal used to supply the internal base voltage of the module;

the resistor $R_2$ is connected across the reference voltage terminal and a APS Set pin of the TRANSPONDER;

the resistor $R_3$ is connected across a APS Sense pin of the TRANSPONDER and the reference voltage terminal;

the resistor $R_4$ is connected across the reference voltage terminal and the bias voltage terminal.

According to the technical solution of the present invention, since the resistance element connected across the reference voltage terminal and internal bias voltage terminal of the power supply control chip has a shunting effect, the voltage of the output terminal of the power supply control chip can be regulated; the resistance value of the resistance element can be determined by calculation, thus rendering that the selection for power supply control chip is converted to the selection for resistance element, which expands the selection scope of power supply control chip and is helpful to reduce development cost. Moreover, since a high precision internal bias voltage terminal of power supply control chip is used, no more elements are required to build a shunting circuit, which can save the space of circuit board as well as ensure precision of supply voltage.

DETAILED DESCRIPTION OF THE EMBODIMENTS

The technical solution in the embodiment of the present invention will be illustrated hereinafter in conjunction with the drawings. The drawings are used to help understanding the technical solution in the embodiments rather than to limit the invention in the forms shown by the drawings during the realization.

Figure 1A:
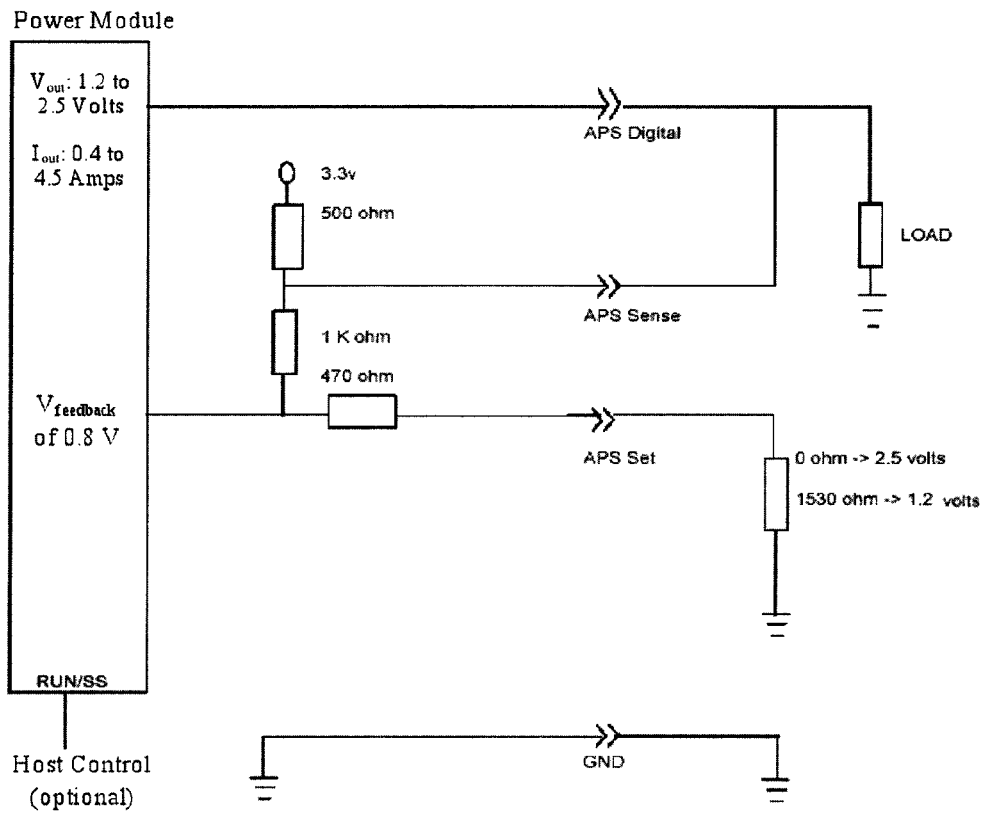
FIG. 1A is the connection block diagram given by the 300 PIN MSA 40 Gb TRANSPONDER protocol between the Adaptable Power Supply (APS) and the TRANSPONDER.
Figure 1B:
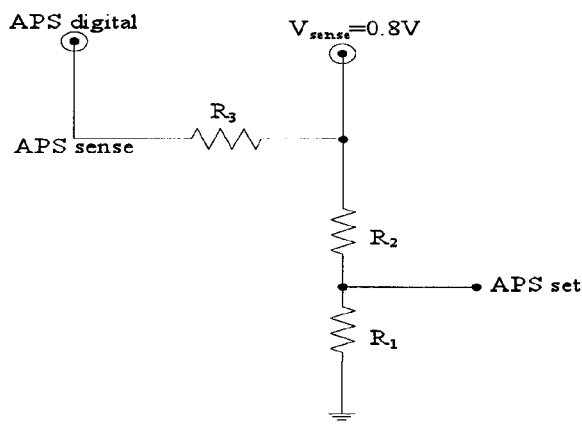
FIG. 1B is the simplified circuit diagram of FIG. 1.
Figure 2:
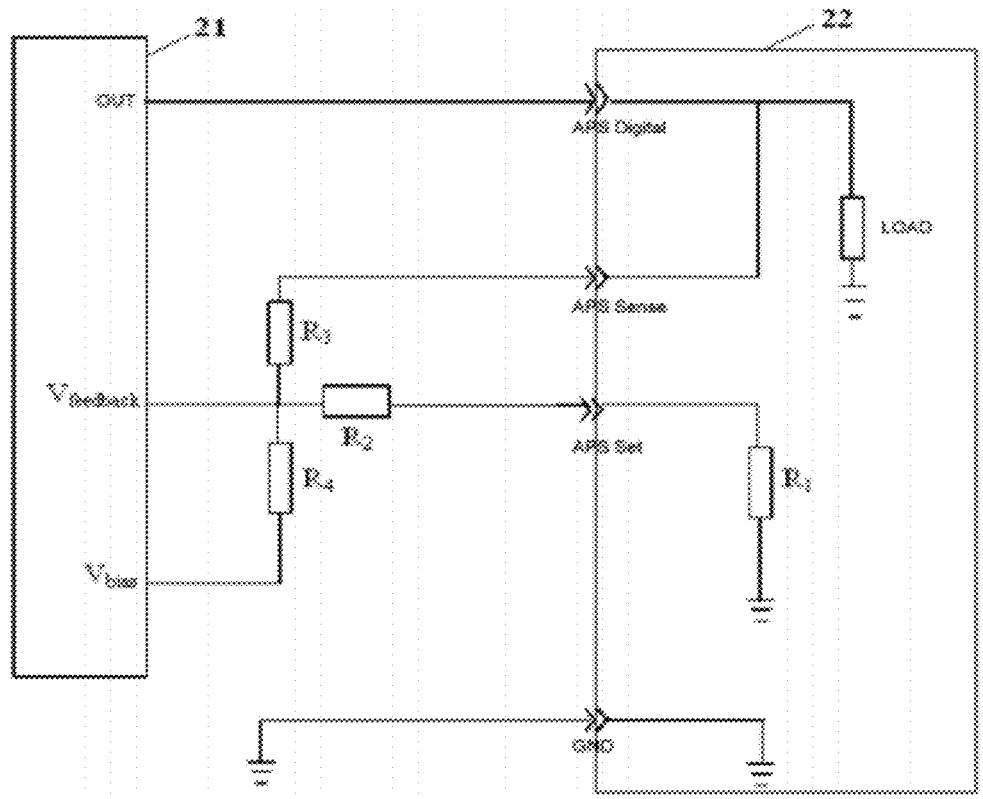
FIG. 2 is the schematic diagram of the mode for supplying power to a 300 PIN MSA 40 Gb TRANSPONDER in the present embodiment.

In the present embodiment, as shown in FIG. 2, the power supply control module 21 supplies power to the TRANSPONDER 22 through the APS Digital pin of the 300 PIN MSA 40 Gb TRANSPONDER 22; the reference voltage terminal of the power supply control module 21 is connected to the APS Sense pin of the 300 PIN MSA 40 Gb TRANSPONDER by a resistors $R_3$, connected to the APS Set pin of the TRANSPONDER 22 by a resistors $R_2$ and connected to the bias voltage terminal of itself by a resistor $R_4$.

Figure 3:
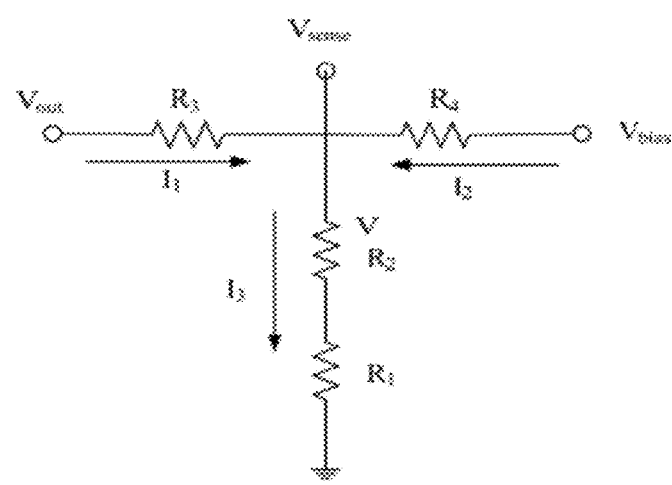
FIG. 3 is the schematic diagram when applying Kirchhoff's Current Law to the circuit which connects the APS and TRANSPONDER.

The power supply control module 21 may use a power supply control chip of which bias voltage terminal is generally used to supply base voltage $V_{bias}$ to the chip. While in the embodiment, applying Kirchhoff's Current Law, the current shunting is performed by the internal bias voltage pin, thus resolving the limit to the output voltage $V_{sense}$=0.8V of the APS power supply control chip. During the circuit is connected, as shown in FIG. 3, apply Kirchhoff's Current Law to the circuit connecting the APS and TRANSPONDER, and connect the resistor $R_4$ across the reference voltage terminal pin (indicated as $V_{sense}$ in the figures) and internal bias voltage terminal pin (indicated as $V_{bias}$ in the figures) of the power supply control chip. According to the circuit shown in FIG. 3, it can be concluded that:

$$I_1=(V_{out}-V_{sense})/R_3,$$

$$I_2=(V_{bias}-V_{sense})/R_4, \text{ and}$$

$$I_3=V_{sense}/(R_1+R_2).$$

Figure 4:
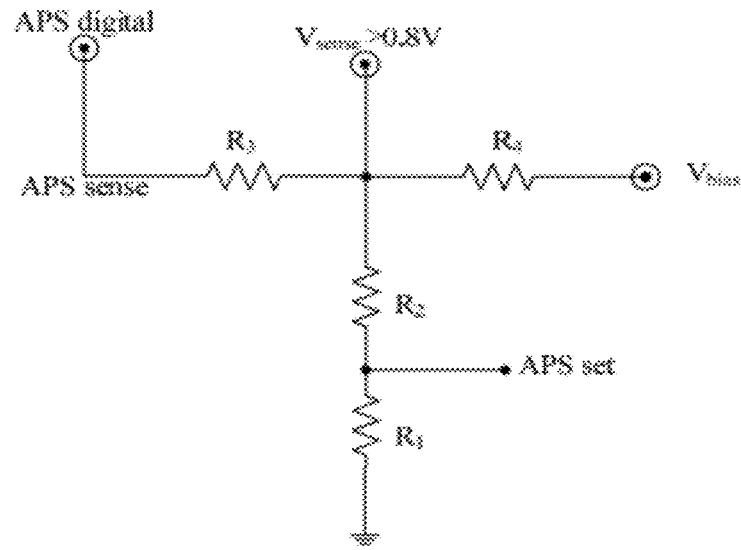
FIG. 4 is the simplified diagram of the circuit connecting the APS and TRANSPONDER.

In FIG. 3, $I_1$ is the current flowing through $R_3$, $I_2$ is the current flowing through $R_4$ and $I_3$ is the current flowing through $R_1$ & $R_2$. The definition of Kirchhoff's Current Law is that the sum of the currents flowing to some node at any moment is equal to the sum of the currents flowing out of the node. So it can be known from the Kirchhoff's Current Law that $I_3=I_1+I_2$. According to this formula and the above expression formulae of $I_1$, $I_2$ and $I_3$, in the simplified diagram of the circuit connecting the APS and TRANSPONDER which is shown in FIG. 4, it can be concluded that:

$$V_{APS\_Digital}=R_3 \times V_{sense}/(R_2-R_1)-(V_{bias}-V_{sense}) \times R_3/R_4+V_{sense} \quad (2).$$

In Formula (2), the APS output voltage is still the sum of the voltage drop of $R_3$ and the voltage $V_{sense}$, while the current flowing through $R_3$ is the difference of that flowing through $R_2$ and $R_4$. That is to say, $R_4$ has a shunting effect. The output voltage range of the output terminal of the power supply control module 21 may be 1.2V~2.5V and the output current range thereof may be 0.4 A~4.5 A. Since $R_4$ has a shunting effect, the voltage of the reference voltage terminal $V_{sense}$ of the power supply control chip shall be more than 0.8V.

The resistance value of the grounding resistor $R_1$ of the APS Set pin of the TRANSPONDER is pre-set so as to enable the equivalent load LOAD of the TRANSPONDER to obtain the voltage required, wherein the voltage is the input voltage of the APS Digital pin. The resistance values of the resistors $R_2$, $R_3$ and $R_4$ are determined by the resistor $R_1$ and the specified input voltage of APS Digital pin. To meet the correlation regulated in Table 1 between $R_1$ and $V_{out}$, each row of data in Table 1 may be substituted in Formula (2) to obtain 4 equations, wherein the $V_{out}$ value is substituted in $V_{APS\_Digital}$ of Formula (2), the $V_{sense}$ value uses the output voltage value of the selected power supply control chip, wherein the output voltage value shall be more than 0.8V, and $V_{bias}$ value uses the internal bias voltage of the selected power supply control chip. Solve the simultaneous equations set formed by the 4 equations to obtain a set of $R_2$, $R_3$ and $R_4$ values, and then build a circuit according to the obtained $R_2$, $R_3$ and $R_4$ values, thus realizing that the $V_{out}$ specified in Table 1 is obtained by using a power supply control chip with a reference voltage more than 0.8V.

Figure 5:
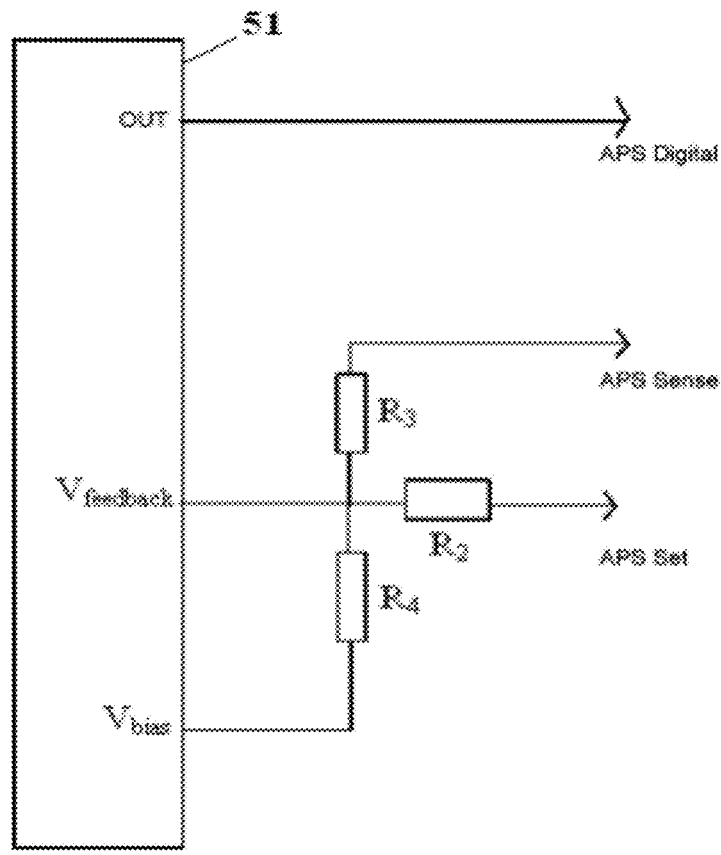
FIG. 5 is the structural schematic diagram of the apparatus for supplying power to a 300 PIN MSA 40 Gb TRANSPONDER in the present embodiment.

Based on the above method, the apparatus in the present embodiment is detailed hereinafter. As shown in FIG. 5, the apparatus in the present embodiment mainly comprises a power supply control module 51, a resistor $R_2$, a resistor $R_3$ and a resistor $R_4$. The power supply control module 51 contains a reference voltage terminal $V_{feedback}$ used to receive external feedback voltage and a bias voltage terminal $V_{bias}$ used to provide the internal base voltage of the module. The power supply control module 51 is configured to supply power to the APS Digital pin of the 300 PIN MSA 40 Gb TRANSPONDER by the output port OUT.

As shown in the figures, the resistor $R_2$ is connected across the reference voltage terminal $V_{feedback}$ of the power supply control module 51 and the APS Set pin of the TRANSPONDER, the resistor $R_3$ is connected across the APS Sense pin of the TRANSPONDER and the reference voltage terminal $V_{feedback}$, and the resistor $R_4$ is connected across the reference voltage terminal $V_{feedback}$ and the bias voltage terminal $V_{bias}$.

The power supply control module may use a power supply control chip with a reference voltage more than 0.8V, wherein the output voltage range of the power supply control chip contains 1.2V~2.5V and the output current range thereof contains 0.4 A~4.5 A.

According to the technical solution of the present embodiment, since the resistance element connected across the reference voltage terminal and internal bias voltage terminal of the power supply control chip has a shunting effect, the voltage of the output terminal of the power supply control chip can be regulated; the resistance value of the resistance element can be determined by calculation, thus rendering that the selection for power supply control chip is converted to the selection for resistance element, which expands the selection scope of power supply control chip and is helpful to reduce development cost. Moreover, in the embodiment, since a high precision internal bias voltage terminal of power supply control chip is used, no more elements are required to build a shunting circuit, which can save the space of circuit board as well as ensuring precision of supply voltage.

Obviously, those skilled in this art may make various changes and alterations of the present invention without deviation from the spirit and scope of the present invention. Thus, if any such change or alteration is within the scope of the claims and equivalent technology of the present invention, the present invention is also intended to contain these changes and alterations.

What is claimed is:

1. A method for supplying power to a 300 PIN MSA 40 Gb TRANSPONDER, comprising:
    a power supply control module supplying power to the 300 PIN MSA 40 Gb TRANSPONDER through a APS Digital pin of the 300 PIN MSA 40 Gb TRANSPONDER;

a reference voltage terminal of the power supply control module connecting to a APS Sense pin of the 300 PIN MSA 40 Gb TRANSPONDER by a resistor $R_3$, connecting to a APS Set pin of the 300 PIN MSA 40 Gb TRANSPONDER by a resistor $R_2$ and connecting to a bias voltage terminal of itself by a resistor $R_4$, wherein the resistance values of the resistors $R_2$, $R_3$ and $R_4$ are determined according to a preset grounding resistance of the APS Set pin and a specified input voltage of the APS Digital pin.

2. The method according to claim 1, wherein the voltage of the reference voltage terminal is more than 0.8V.

3. The method according to claim 1, wherein the output voltage range of the output terminal of the power supply control module is 1.2V~2.5V and the output current range thereof is 0.4 A~4.5 A.

4. The method according to claim 1, wherein the step of determining the resistance values of the resistors $R_2$, $R_3$ and $R_4$ comprises the following steps:

substituting several groups of corresponding $R_1$ and $V_{out}$ values in the formula $V_{out}=R_3 \times V_{sense}/(R_2+R_1)-(V_{bias}-V_{sense}) \times R_3/R_4 + V_{sense}$ to obtain several equations;

solving the simultaneous equations set established by the several equations to obtain the resistance values of the resistors $R_2$, $R_3$ and $R_4$;

wherein $V_{out}$ indicates the specified input voltage of the APS Digital pin, $V_{sense}$ indicates the voltage value of the reference voltage terminal of the power supply control module, $R_1$ indicates the preset grounding resistance of the APS Set pin, and $R_2$, $R_3$ and $R_4$ indicate the resistance values of the resistors $R_2$, $R_3$ and $R_4$ respectively.

5. An apparatus for supplying power to a 300 PIN MSA 40 Gb TRANSPONDER, comprising a power supply control module, a resistor $R_2$, a resistor $R_3$ and a resistor $R_4$, wherein the power supply control module is configured to supply power to the 300 PIN MSA 40 Gb TRANSPONDER through a APS Digital pin of the 300 PIN MSA 40 Gb TRANSPONDER, and the power supply control module contains a reference voltage terminal used to receive external feedback voltage and a bias voltage terminal used to supply an internal base voltage of the module;

the resistor $R_2$ is connected across the reference voltage terminal and a APS Set pin of the TRANSPONDER;

the resistor $R_3$ is connected across a APS Sense pin of the TRANSPONDER and the reference voltage terminal;

the resistor $R_4$ is connected across the reference voltage terminal and the bias voltage terminal;

wherein the resistance values of the resistors $R_2$, $R_3$ and $R_4$ are determined according to a preset grounding resistance of the APS Set pin and a specified input voltage of the APS Digital pin.

6. The device according to claim 5, wherein the power supply control module comprises a power supply control chip with a reference voltage more than 0.8V.

7. The device according to claim 5, wherein the power supply control module comprises a power supply control chip of which the output voltage range contains 1.2V~2.5V and the output current range contains 0.4 A~4.5 A.

* * * * *